United States Patent Office 3,127,362
Patented Mar. 31, 1964

3,127,362
STARCH ESTERS AND PROCESS OF
PREPARING SAME
Oscar P. Cohen, Longmeadow, and John F. Heaps, Springfield, Mass., assignors to Monsanto Chemical Company, St. Louis, Mo., a corporation of Delaware
No Drawing. Filed July 23, 1957, Ser. No. 673,559
7 Claims. (Cl. 260—17.4)

This invention relates to novel starch reaction products and to methods for preparing same.

It is an object of this invention to provide novel chemical products and methods for preparing same.

Other objects and advantages of this invention will be apparent from the following detailed description thereof.

It has been discovered that valuable water-dispersible products can be obtained by esterifying starch with a carboxyl group containing polymer which comprises an essentially equimolar interpolymer of (a) a monomer of the group consisting of maleic anhydride, maleic acid, partial aliphatic alcohol esters of maleic acid and mixtures thereof and (b) a monomer of the group consisting of ethylene, propylene, isobutylene, a monovinylidene aromatic hydrocarbon compound, a vinyl alkyl ether, a vinyl ester of a carboxylic acid and mixtures thereof.

The following examples are set forth to illustrate more clearly the principle and practice of this invention to those skilled in the art. Where parts or percentages are mentioned, they are parts or percentages by weight.

EXAMPLE I

Part A

Fifty parts of an unmodified pearl corn starch and fifty parts of a styrene-maleic anhydride interpolymer (having a specific viscosity of 2.5–3.0 as determined in a 2% solution in acetone) are charged to a Baker-Perkins mixer and thoroughly mixed while being heated to a temperature of 95–105° C. Twenty-five parts of a 50% sodium hydroxide solution are sprayed onto the agitated mixture over a period of 15 minutes and mixing is continued for 1 hour while maintaining the temperature at 95–105° C. The reaction product thus obtained consists of unreacted starch, unreacted styrene-maleic anhydride interpolymer and the esterification product formed between the starch and the styrene-maleic anhydride interpolymer.

Parts B–D

Four additional esterification products are prepared as described in Part A above, except that (1) the quantities of starch and styrene-maleic anhydride interpolymer employed are, respectively, 90 parts starch and 10 parts interpolymer, 75 parts starch and 25 parts interpolymer and 25 parts starch and 75 parts interpolymer and (2) the quantity of 50% sodium hydroxide solution employed is one-half the quantity of the styrene-maleic anhydride included in the reaction mixture.

EXAMPLE II

Example I, Part A is repeated except that the styrene-maleic anhydride interpolymer is replaced with an ethylene-maleic anhydride interpolymer having a specific viscosity of about 1.3 as determined in a 1% solution in water at 25° C. The reaction product has properties which in general correspond to those of the product obtained in Example I, Part A.

EXAMPLE III

Example I, Part A is repeated except that the styrene-maleic anhydride interpolymer is replaced with a propylene-maleic anhydride interpolymer having a specific viscosity of about 1.5 as determined in a 1% solution in water at 25° C. A product of generally comparable properties is obtained.

EXAMPLE IV

Example I, Part A is repeated except that the styrene-maleic anhydride interpolymer is replaced with a vinyl acetate-maleic anhydride interpolymer having a specific viscosity of about 1.0 as determined in a 1% solution in water at 25° C. The reaction product obtained is a mixture of unreacted starch, unreacted vinyl acetate-maleic anhydride interpolymer and the esterification product of starch and the vinyl acetate-maleic anhydride interpolymer.

The products of this invention are esterification products of 25–95% starch and, correspondingly, 75–5% of a carboxyl group containing polymer. The preferred products of the invention are esterification products of 50–90% starch and, correspondingly, 50–90% of a carboxyl group containing polymer.

The starch employed in the practice of this invention may be any of the natural starches or modified starches such as oxidized starches, enzyme converted starches, starch ethers, etc. Typical of suitable starches are corn starch, potato starch, wheat starch, rice starch, sago starch, soluble starch, chlorinated starch, tapioca starch, arrow root starch, dextrin, hydroxyethyl starch, etc.

The carboxyl group containing polymers employed in the invention are essentially equimolar interpolymers of (a) a monomer of the group consisting of maleic anhydride, maleic acid, partial aliphatic alcohol esters of maleic acid and mixtures thereof and (b) a monomer of the group consisting of ethylene, propylene, isobutylene, a monovinylidene aromatic hydrocarbon compound, a vinyl alkyl ether, a vinyl ester of a carboxylic acid and mixtures thereof. It is generally preferred to employ maleic anhydride as the carboxyl group containing monomer in the interpolymers. It has been observed that for use in the surface sizing of paper and paper board, optimum properties are obtained with the esters derived from styrene-maleic anhydride interpolymers. Excellent properties for this purpose also are obtained with the esters derived from interpolymers of maleic anhydride and either ethylene or propylene. Other typical interpolymers which may be employed in the invention are vinyl toluene-maleic anhydride interpolymers, vinyl acetate-maleic anhydride interpolymers, vinyl methyl ether-maleic anhydride interpolymers, vinyl benzoate-maleic anhydride interpolymers, isobutylene-maleic anhydride interpolymers, styrene-maleic anhydride interpolymers esterified with 5–25 mol percent of an aliphatic alcohol such as methanol, ethanol, secondary butanol, etc. Where the esterification products of the invention are to be employed in sizing paper products, it is preferred that the carboxyl group containing polymer included therein have a relatively high molecular weight.

In one embodiment of the invention, the esterification products may be prepared by forming an intimate physical admixture of starch and the carboxyl group containing polymer, heating said mixture and, while agitating the mixture, wetting same with an aqueous solution of an alkali metal hydroxide. The reaction may be carried out in any of many well-known type mixers such as dough mixers, ribbon blenders, etc. The esterification is usually run at elevated temperatures, preferably in the range of about 80–120° C. The alkali metal hydroxide solutions employed normally will contain 10–70 weight percent of the alkali metal hydroxide and are added to the reaction mixture in an amount to provide about 15–75 parts of the alkali metal hydroxide per 100 parts of the carboxyl group containing polymer. The reaction products obtained by this embodiment of the invention consist of unreacted starch, unreacted carboxyl group containing polymer and the water-dispersible esterification product formed between the starch and the carboxyl group containing polymer. If desired, the reaction mixture can be resolved into its components, but usually this is not necessary as the reaction mixture obtained has utility for many purposes such as in the surface sizing of paper.

As will be obvious to those skilled in the art, the esterification products of the invention can be prepared by methods other than that described immediately above. Specifically, the products can be prepared by slurrying and heating a mixture of starch, the carboxyl group containing polymer and an alkaline catalyst in an inert organic liquid such as aliphatic and/or aromatic hydrocarbons.

The esterification products of this invention are of value in the surface sizing of paper and paper board as described in detail in our copending application Serial No. 673,560, filed of even date herewith. Specifically, paper box board that is calender-sized with a 6% solution of the reaction product of Example I has better ink hold out properties (as measured by the standard gloss test employed in the paper industry) than an identical paper box board that is calender-sized with (a) a 6% solution of the corn starch employed in Example I, (b) a 6% solution of the styrene-maleic anhydride interpolymer employed in Example I or (c) an aqueous solution containing 3 weight percent of both the corn starch and the styrene-maleic anhydride interpolymer employed in Example 1. The products of the invention also have utility as a binder for pigment coating compositions employed in the paper industry and as a beater additive in the manufacture of paper.

The above descriptions and particularly the examples are set forth by way of illustration only. Many other variations and modifications of the invention will be apparent to those skilled in the art and may be employed without departing from the spirit and scope of the invention herein described.

What is claimed is:

1. A water-dispersible esterification product of 25–95 weight percent starch and, correspondingly, 75–5 weight percent of an essentially equimolar interpolymer of (a) a monomer of the group consisting of maleic anhydride, maleic acid, partial aliphatic alcohol esters of maleic acid and mixtures thereof, and (b) a monomer of the group consisting of ethylene, propylene, isobutylene, a monovinylidene aromatic hydrocarbon compound, a vinyl alkyl ether, a vinyl ester of a carboxylic acid and mixtures thereof.

2. A water-dispersible esterification product of 25–95 weight percent starch and, correspondingly, 75–5 weight percent of an essentially equimolar interpolymer of styrene and maleic anhydride.

3. A water-dispersible esterification product of 25–95 weight percent starch and, correspondingly, 75–5 weight percent of an essentially equimolar interpolymer of ethylene and maleic anhydride.

4. A process which comprises preparing a substantially dry intimate physical admixture of 25–95 weight percent starch and, correspondingly, 75–5 weight percent of a carboxyl group containing polymer, heating said admixture to a temperature of about 80–120° C., and, while agitating said admixture, adding thereto an aqueous solution of an alkali metal hydroxide; said carboxyl group containing polymer being an essentially equimolar interpolymer of (a) a monomer of the group consisting of maleic anhydride, maleic acid, partial aliphatic alcohol esters of maleic acid and mixtures thereof and (b) a monomer of the group consisting of ethylene, propylene, isobutylene, a monovinylidene aromatic hydrocarbon compound, a vinyl alkyl ether, a vinyl ester of a carboxylic acid and mixtures thereof, said aqueous solution of alkali metal hydroxide containing 10–70% by weight of alkali metal hydroxide and being added to the reaction in an amount to provide 15–75 parts of alkali metal hydroxide per 100 parts of the carboxyl group containing polymer.

5. The process of claim 4 wherein the carboxyl group containing polymer employed therein is an essentially equimolar interpolymer of styrene and maleic anhydride.

6. The process of claim 4 wherein the carboxyl group containing polymer employed therein is an essentially equimolar interpolymer of ethylene and maleic anhydride.

7. A water-dispersible esterification product of 95 weight percent starch and, correspondingly, 5 weight percent of an essentially equimolar interpolymer of vinyl methyl ether and maleic anhydride.

References Cited in the file of this patent

UNITED STATES PATENTS

| | | |
|---|---|---|
| 2,667,462 | Wildish et al. | Jan. 26, 1954 |
| 2,668,156 | Caldwell et al. | Feb. 2, 1954 |
| 2,725,367 | Niederhauser | Nov. 29, 1955 |